(12) United States Patent
Hsu

(10) Patent No.: US 7,193,843 B2
(45) Date of Patent: Mar. 20, 2007

(54) DISPLAY DEVICE WITH A BRACKET COVERING

(75) Inventor: Hui-Hsiung Hsu, Chung Ho (TW)

(73) Assignee: Amtran Technology Co., Ltd., Chung Ho (TW)

( * ) Notice: Subject to any disclaimer, the term of this patent is extended or adjusted under 35 U.S.C. 154(b) by 49 days.

(21) Appl. No.: 11/109,050

(22) Filed: Apr. 19, 2005

(65) Prior Publication Data

US 2006/0231697 A1     Oct. 19, 2006

(51) Int. Cl.
    *F16M 11/00*      (2006.01)
(52) U.S. Cl. .................. 361/681; 248/371; 248/919
(58) Field of Classification Search ........ 248/917–924, 248/371; 361/681–683
See application file for complete search history.

(56) References Cited

U.S. PATENT DOCUMENTS

| | | | |
|---|---|---|---|
| 6,189,842 B1* | 2/2001 | Bergeron Gull et al. . | 248/125.1 |
| 6,229,584 B1* | 5/2001 | Chuo et al. .................. | 349/58 |
| 6,915,996 B2* | 7/2005 | Lin ........................ | 248/288.51 |
| 6,954,221 B2* | 10/2005 | Wu ............................. | 361/681 |
| 7,014,154 B2* | 3/2006 | Jeong et al. ................ | 248/157 |
| 2003/0075649 A1* | 4/2003 | Jeong et al. ................ | 248/157 |

* cited by examiner

*Primary Examiner*—Carl D. Friedman
*Assistant Examiner*—Steven Marsh
(74) *Attorney, Agent, or Firm*—Frommer Lawrence & Haug LLP; Ronald R. Santucci

(57) ABSTRACT

A display device includes a display and a stand. The stand serves to support the display, and includes a bracket and a bracket covering. The bracket is mounted on a rear surface of the display, and has a peripheral edge that is formed with a plurality of tabs. The bracket covering includes a frame body that frames a portion of the peripheral edge of the bracket and that is formed with a plurality of pockets, each of which receives a respective one of the tabs of the bracket.

5 Claims, 7 Drawing Sheets

DISPLAY DEVICE WITH A BRACKET COVERING

BACKGROUND OF THE INVENTION

1. Field of the Invention

The invention relates to a display device, more particularly to a display device with a bracket covering for aesthetic purposes.

2. Description of the Related Art

A conventional display device includes a display and a stand. The stand serves to support the display, and includes a base, a swiveling mechanism, and a covering. The base is disposed on a flat surface. The swiveling mechanism is coupled between the base and the display, and is operable so as to dispose the display at a desired angle with respect to the base. The covering serves to cover the swiveling mechanism, and is fastened to the display by means of fastener screws.

The conventional display device is disadvantageous in that the fastener screws are exposed. This renders the conventional display device aesthetically unappealing.

To solve this problem, it has been proposed to use a screwless covering. This, however, can cause the same problem. Particularly, the covering includes first and second cover members that are latched to each other. A gap exists between the first and second cover members of the covering, which in a similar manner, renders the conventional display device aesthetically unappealing.

SUMMARY OF THE INVENTION

Therefore, the object of the present invention is to provide a display device that is capable of overcoming the aforesaid drawbacks of the prior art.

According to the present invention, a display device comprises a display and a stand. The display has a rear surface. The stand serves to support the display, and includes a bracket and a bracket covering. The bracket is mounted on the rear surface of the display, and has a peripheral edge that is formed with a plurality of tabs. The bracket covering includes a frame body that frames a portion of the peripheral edge of the bracket and that is formed with a plurality of pockets, each of which receives a respective one of the tabs of the bracket.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
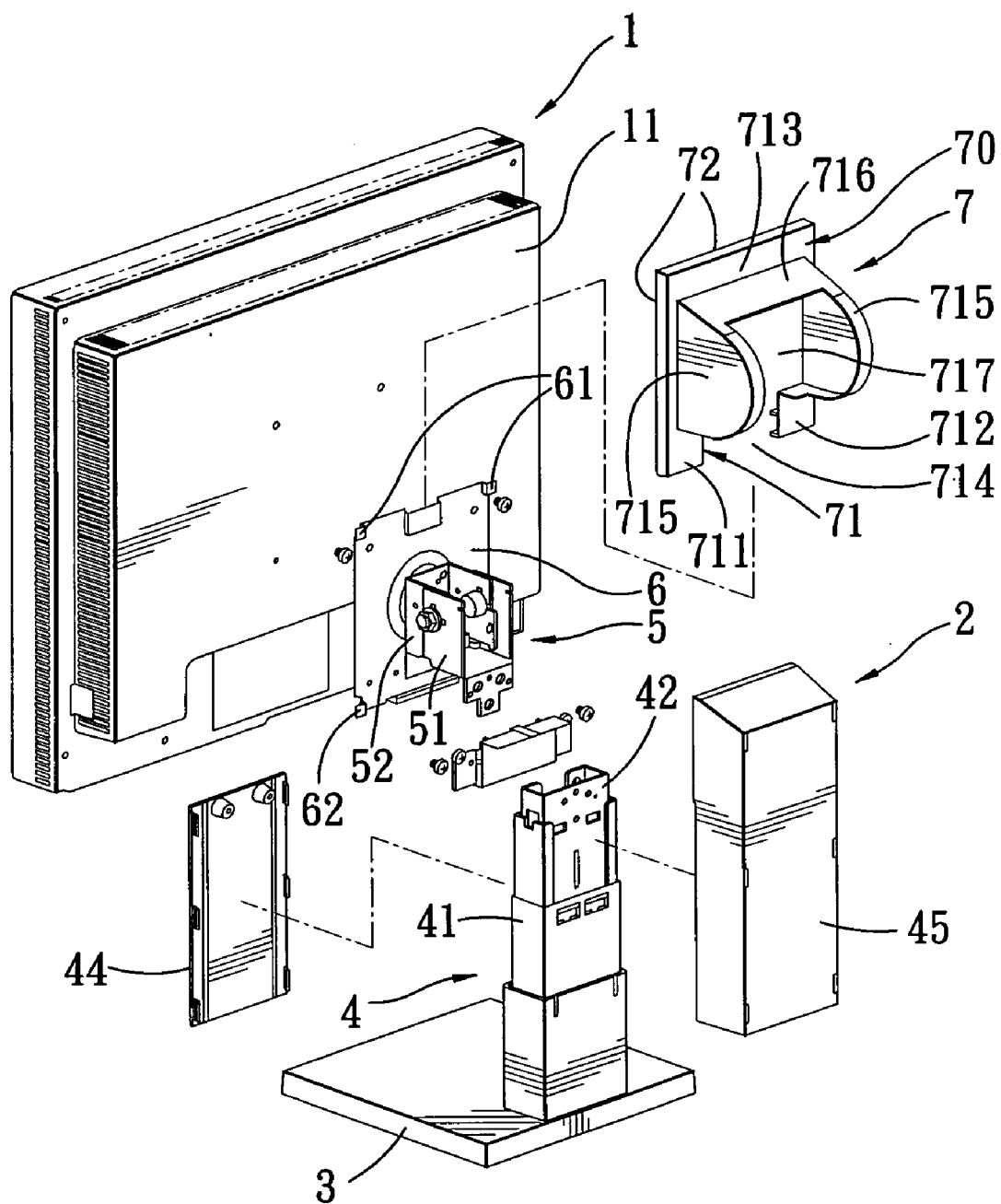
FIG. 1 is an exploded perspective view of the first preferred embodiment of a display device according to the present invention.

Before the present invention is described in greater detail, it should be noted that like elements are denoted by the same reference numerals throughout the disclosure.

Figure 2:
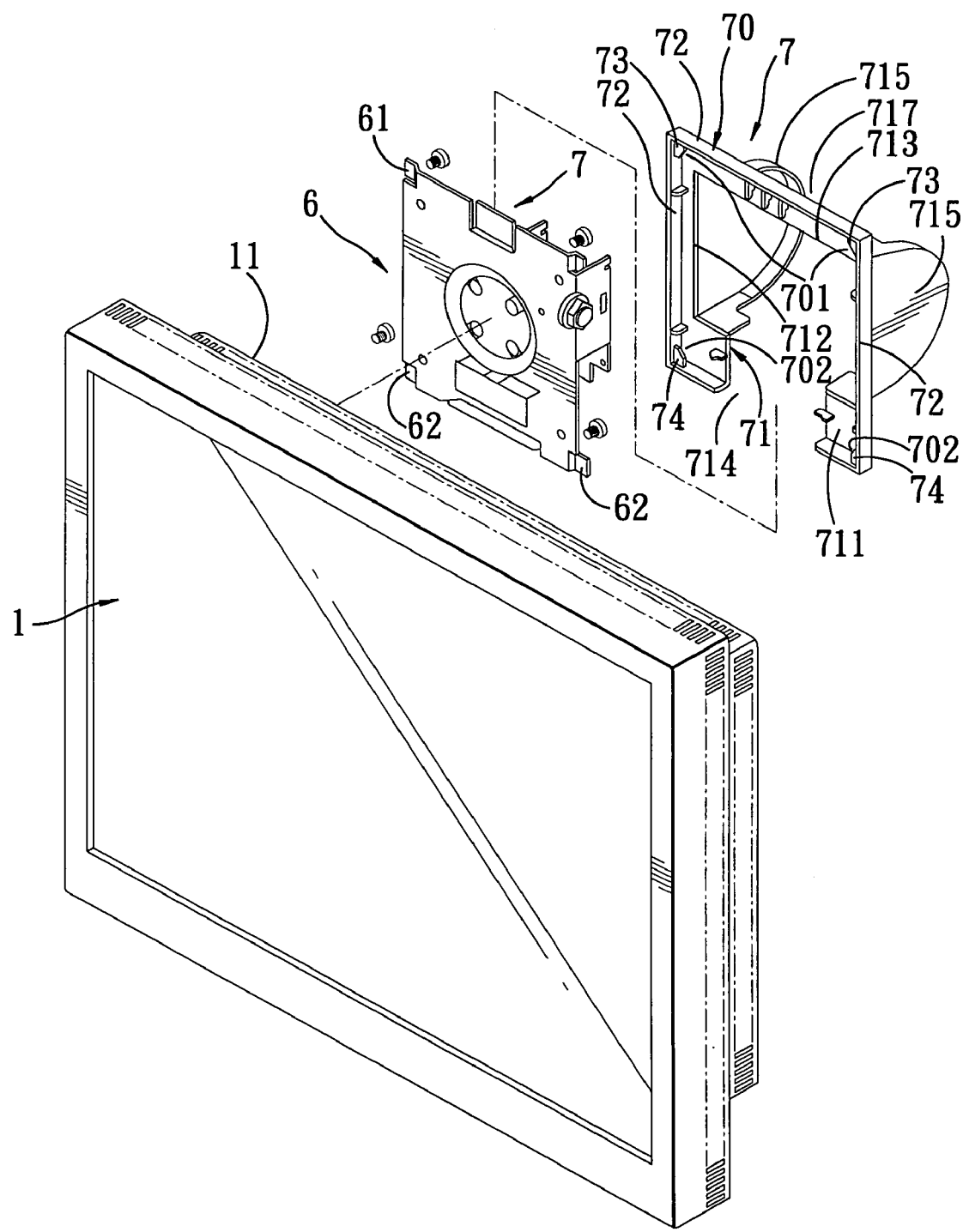
FIG. 2 is an exploded perspective view to illustrate a bracket and a bracket covering of the first preferred embodiment.
Figure 3:
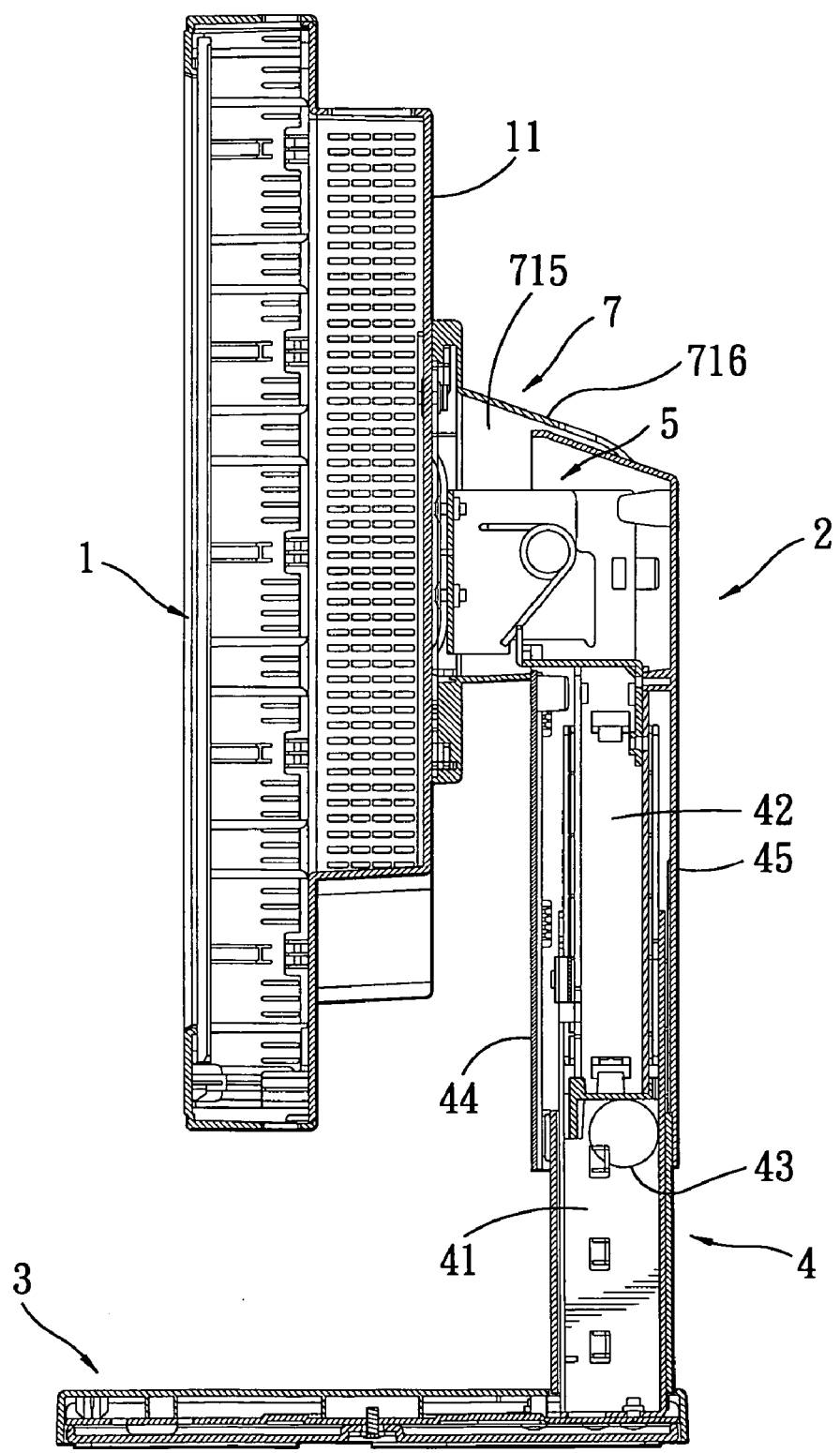
FIG. 3 is a sectional view of the first preferred embodiment.

Referring to FIGS. 1 to 3, the preferred embodiment of a display device according to this invention is shown to include a display 1 and a stand 2.

The display 1, in this embodiment, is a liquid crystal display, and has a rear surface 11.

The stand 2 serves to support the display 1. In particular, the stand 2 includes a bracket 6, a base 3, an upright post 4, a swiveling mechanism 5, and a bracket covering 7.

The bracket 6 is generally rectangular, and has a peripheral edge. In this embodiment, the peripheral edge of the bracket 6 is formed, such as by punching, with a pair of upper tabs 61, each of which is disposed at the upper corners of the bracket 6, and a pair of lower tabs 62, each of which is disposed at the lower corners of the bracket 6. The peripheral edge of the bracket 6 is fastened on the rear surface 11 of the display 1 by means of fastener screws. It is noted that a clearance exists between each tab 61, 62 of the bracket 6 and the rear surface 11 of the display 1.

The base 3 is disposed on a flat surface (not shown) such as a table.

In this embodiment, the upright post 4 permits adjustment of the display 1 to a desired elevation with respect to the base 3. In particular, the upright post 4 includes first and second post members 41, 42. The first post member 41 of the upright post 4 is tubular, and is coupled to the base 3. A spiral spring 43 (see FIG. 3) is disposed in the first post member 41 of the upright post 4. The second post member 42 of the upright post 4 is coupled telescopically to the first post member 41 of the upright post 4, and is movable between lengthened and shortened positions in a known manner. The spiral spring 43 serves to bias the second post member 42 to the lengthened position. In an alternative embodiment, the upright post 4 of the stand is non-adjustable.

The upright post 4 further includes a post covering that serves to conceal the second post member 42 of the upright post 4 in order to enhance the outer appearance of the display 1. The post covering of the upright post 4 surrounds the second post member 42 of the upright post 4, and includes first and second cover members 44, 45, each of which is coupled to and is co-movable with the second post member 42 of the upright post 4.

The swiveling mechanism 5 permits adjustment of the display 1 to a desired angle with respect to the base 3 in a known manner. The swiveling mechanism 5 includes first and second swiveling members 51, 52. The first swiveling member 51 is coupled securely to the second post member 42 of the up right post 4. The second swiveling member 52 is coupled pivotally to the first swiveling member 51 of the swiveling mechanism 5, and is coupled securely to the bracket 6.

The bracket covering 7, preferably made from plastics, includes a frame body 70, a pair of upper pockets 701, and a pair of lower pockets 702. The frame body 70 of the bracket covering 7 includes first and second frame parts 71, 72. The first frame part 71 of the frame body 70 of the bracket covering 7 is generally U-shaped, and includes a pair of parallel pliable arms 711, 712, and an interconnecting arm 713 that interconnects the pliable arms 711, 712 of the first frame part 71 of the frame body 70 of the bracket covering 7. The second frame part 72 of the frame body 70 of the bracket covering 7 is transverse to and extends from an outer periphery of the first frame part 71 of the frame body 70 of the bracket covering 7, and has a pair of upper junctions and a pair of lower junctions. The first and second frame parts 71, 72 cooperate to define a first accommodating space 714.

Each of the upper pockets 701 is formed at a respective one of the upper corners of the frame body 70 of the bracket covering 7. In particular, the frame body 70 further includes a pair of upper pocket-forming pieces 73, each of which is provided at a respective one of the upper junctions of the second frame part 72 of the frame body 70 of the bracket covering 7. The upper pocket-forming pieces 73 and the first and second frame parts 71, 72 of the frame body 70 of the bracket covering 7 cooperate to define the upper pockets 701. Similarly, each of the lower pockets 702 is formed at a respective one of the lower corners of the frame body 70 of the bracket covering 7. In particular, the frame body 70 further includes a pair of lower pocket-forming pieces 74, each of which is provided at a respective one of the lower junctions of the second frame part 72 of the frame body 70 of the bracket covering 7. The lower pocket-forming pieces 74 and the first and second frame parts 71, 72 of the frame body 70 of the bracket covering 7 cooperate to define the lower pockets 702.

The bracket covering 7 further includes a pair of ear lobes 715, each of which is transverse to and extends from a respective one of the pliable arms 711, 712 of the first frame part 71 of the frame body 70 of the bracket covering 7, and an interconnecting piece 716 that is transverse to and that extends from the interconnecting arm 713 of the first frame part 71 of the frame body 70 of the bracket covering 7, and that interconnects the ear lobes 715 of the bracket covering 7. The ear lobes 715 and the interconnecting piece 716 of the bracket covering 7 cooperate to define a second accommodating space 717.

Figure 4:
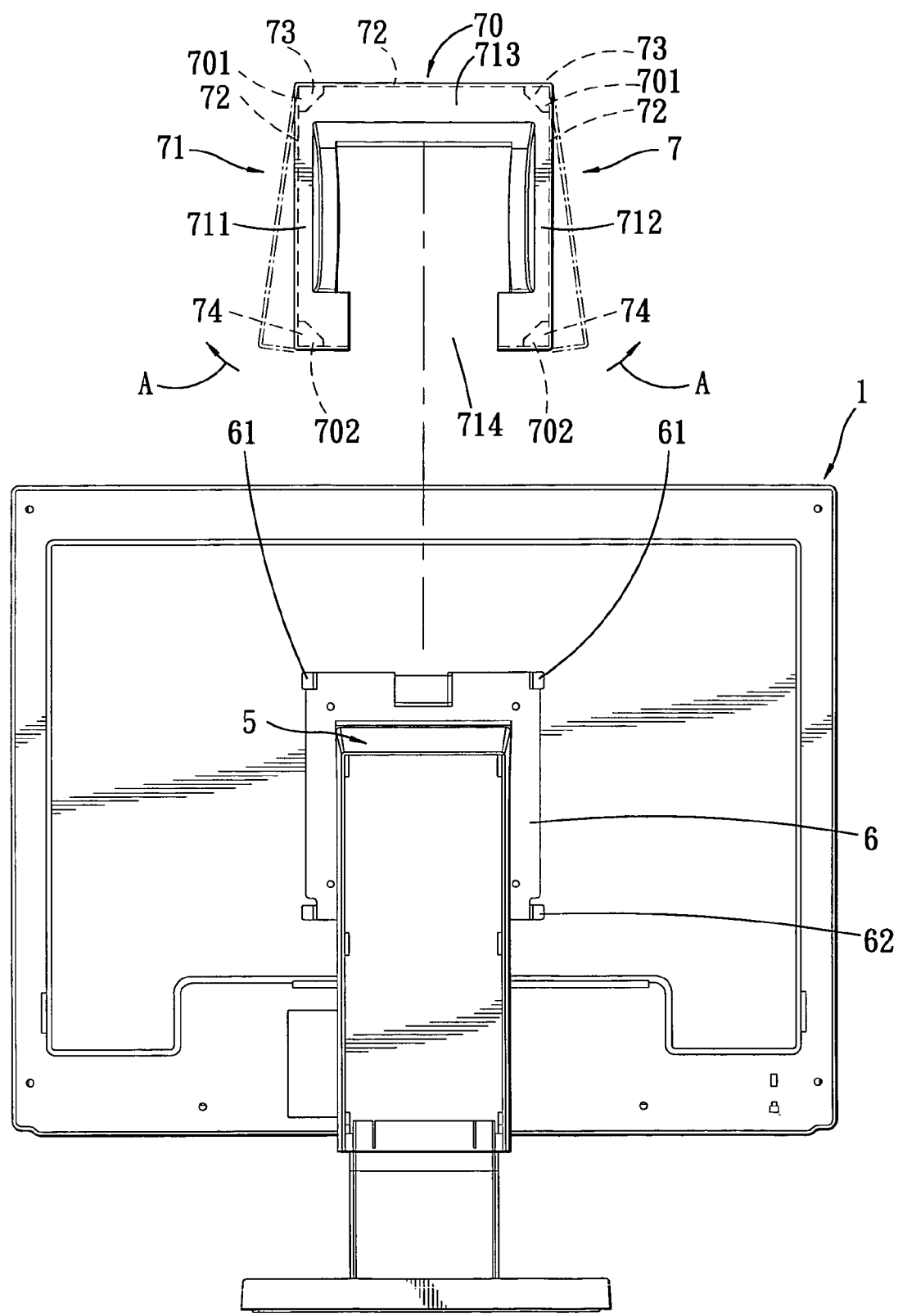
FIG. 4 is a schematic view of the first preferred embodiment to illustrate installation of the bracket covering on the bracket.
Figure 5:
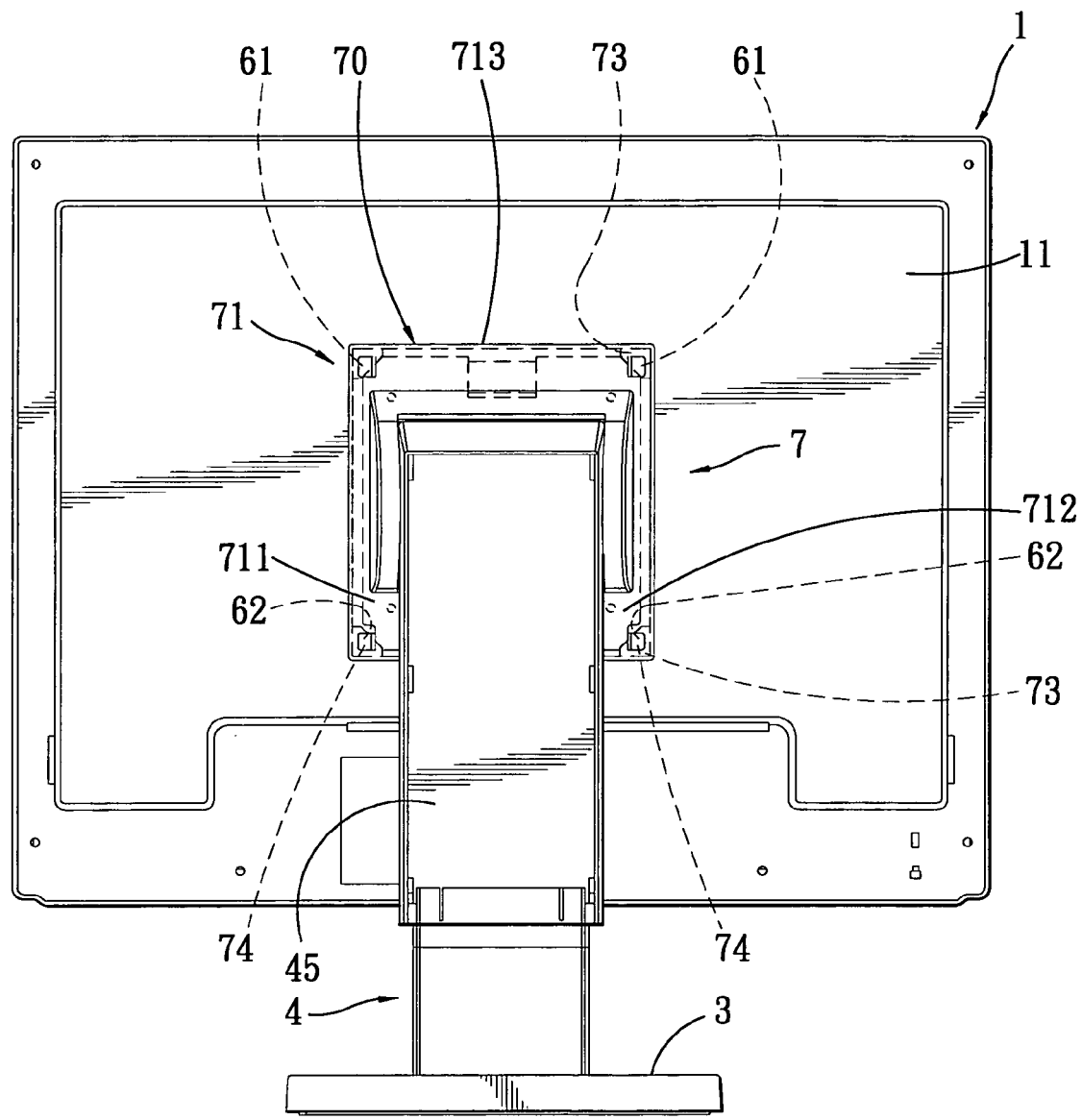
FIG. 5 is a schematic view of the first preferred embodiment to illustrate the bracket covering when installed on the bracket.

To install the bracket covering 7, referring to FIGS. 4 and 5, the pliable arms 711, 712 of the first frame part 71 of the frame body 70 of the bracket covering 7 are pulled apart, as indicated by arrows (A). The bracket covering 7 is then brought toward the bracket 6 such that the bracket 6 is disposed in the first accommodating space 714 in the bracket covering 7, such that the swiveling mechanism 5 is disposed in the second accommodating space 717 in the bracket covering 7, and such that the upper tabs 61 of the bracket 6 are received respectively in the upper pockets 701 of the frame body 70 of the bracket covering 7. Thereafter, the pliable arms 711, 712 of the first frame part 71 of the frame body 70 of the bracket covering 7 are released such that the lower tabs 62 of the bracket 6 are received respectively in the lower pockets 702 of the frame body 70 of the bracket covering 7. Accordingly, a portion of the peripheral edge of the bracket 6 along with the fastener screws, which are used to fasten the bracket 6 to the rear surface 11 of the display 1, and the swiveling mechanism 5 are all concealed by the bracket covering 7, thereby enhancing the outer appearance of the display 1. To remove the bracket covering 7, the procedure is simply performed in reverse.

Figure 6:
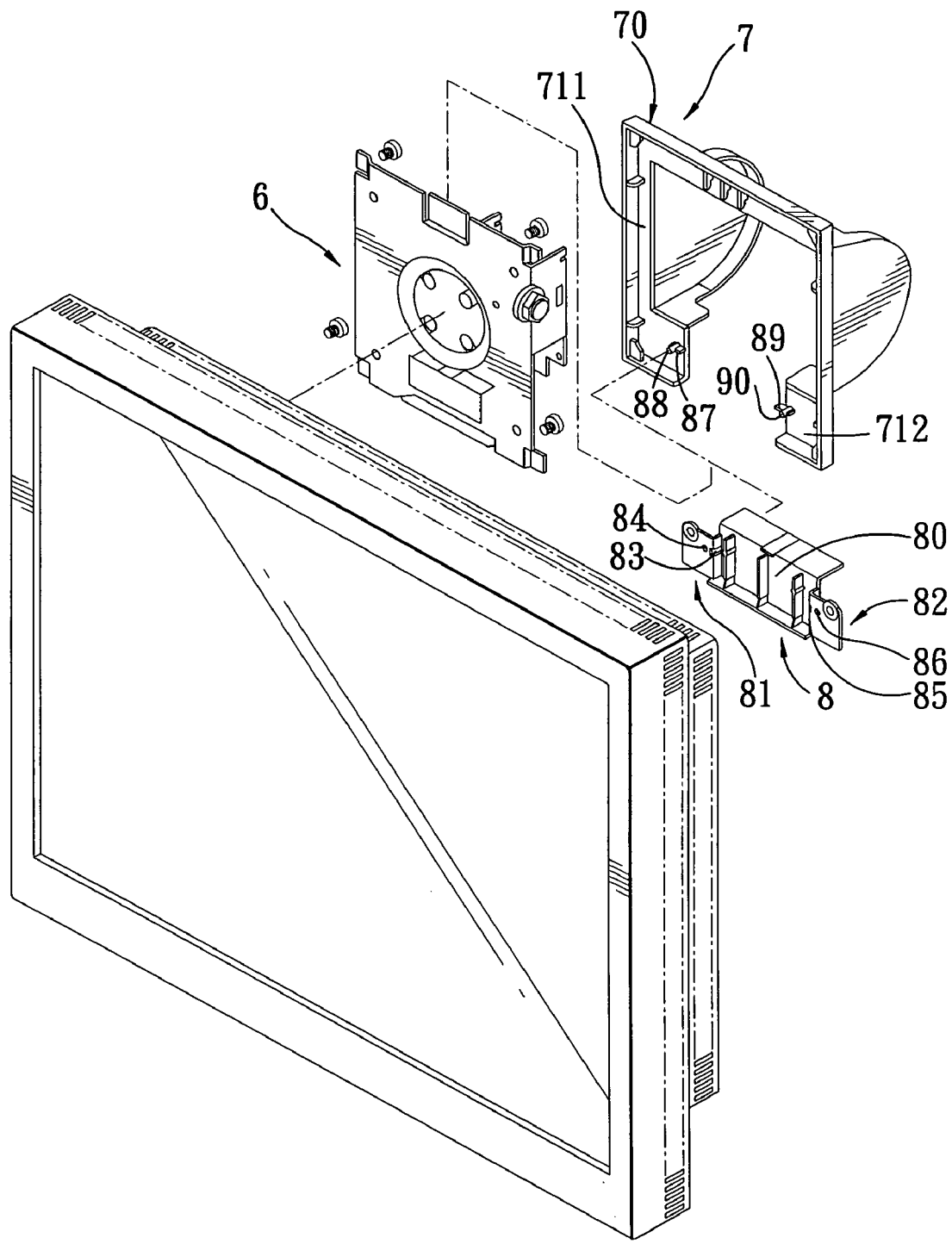
FIG. 6 is an exploded perspective view of the second preferred embodiment of a display device according to the present invention.

FIG. 6 illustrates the second preferred embodiment of a display device according to this invention. When compared with the previous embodiment, the stand further includes a latching unit that serves to fasten securely and removably the bracket covering 7 to the bracket 6. The latching unit includes a latching member 8, a pair of first latching projections 87, 88, and a pair of second latching projections 89, 90.

The latching member 8 includes a base 80, and left and right wings 81, 82. The base 80 of the latching member 8 is secured on the bracket 6, and has left and right end portions. Each of the left and right wings 81, 82 of the latching member 8 is provided on a respective one of the left and right end portions of the base 80 of the latching member 8. In this embodiment, the left wing 81 of the latching member 8 is L-shaped, and has shorter and longer portions. The shorter portion of the left wing 81 of the latching member 8 is formed with a guide hole 83. The longer portion of the left wing 81 of the latching member 8 is formed with an engaging hole 84 therethrough. Moreover, the right wing 82 of the latching member 8 is L-shaped, and has shorter and longer portions. The shorter portion of the right wing 82 of the latching member 8 is formed with a guide hole 85. The longer portion of the right wing 82 of the latching member 8 is formed with an engaging hole 86 there through.

The first latching projections 87, 88 of the latching unit are formed on one of the pliable arms 711 of the first frame part 71 of the frame body 70 of the bracket covering 7, are transverse to each other, and are formed integrally in one piece. Similarly, the second latching projections 89, 90 of the latching unit are formed on the other of the pliable arms 712 of the first frame part 71 of the frame body 70 of the bracket covering 7, are transverse to each other, and are formed integrally in one piece.

Figure 7:
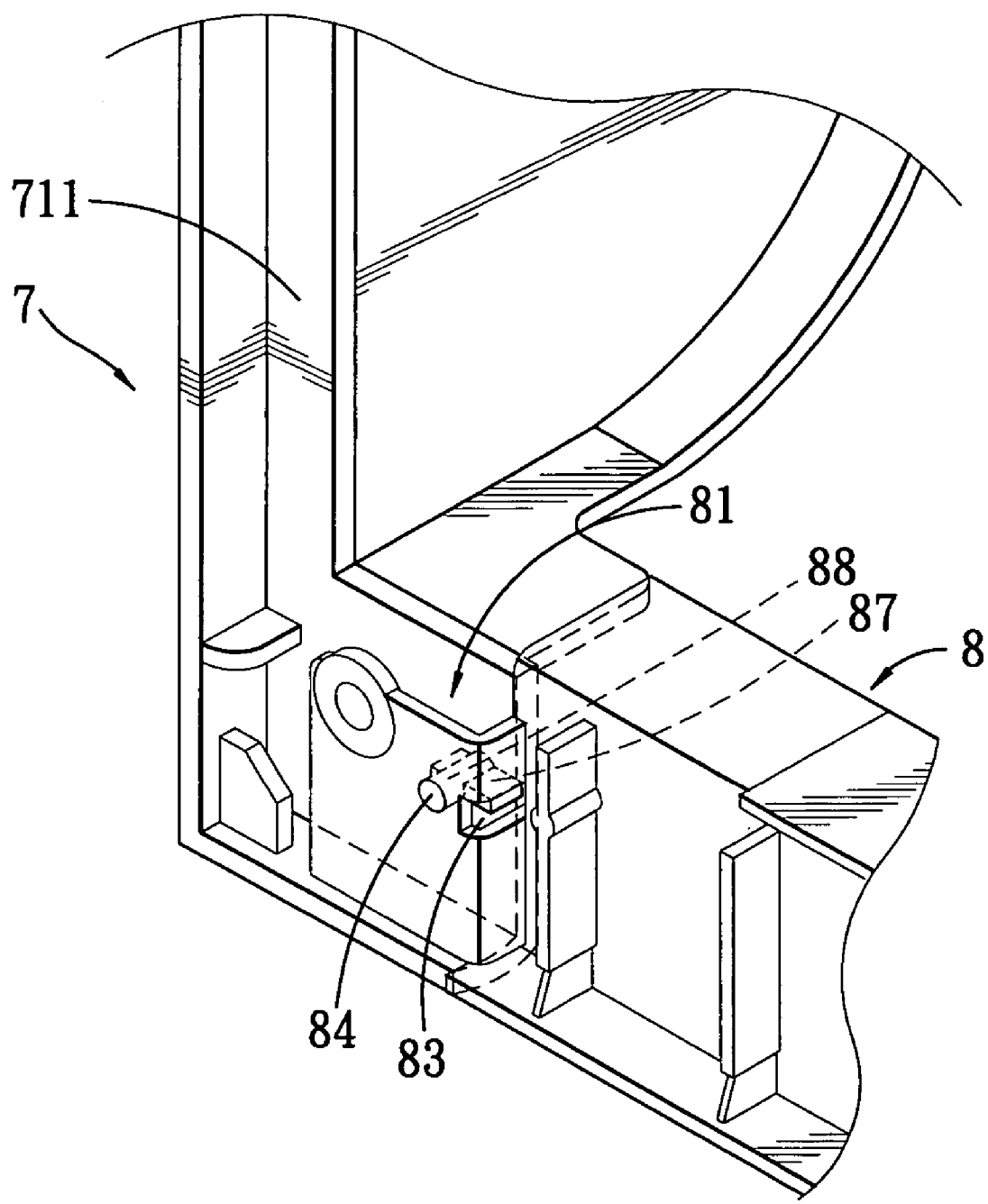
FIG. 7 is a fragmentary perspective view to illustrate a latching unit of the second preferred embodiment.

With further reference to FIG. 7, when the bracket covering 7 is installed on the bracket 6 (see FIG. 6), the first latching projection 87 of the latching unit engages the guide hole 83 in the shorter portion of the left wing 8 1of the latching member 8 of the latching unit, and the first latching projection 88 of the latching unit engages the engaging hole 84 in the longer portion of the left wing 81 of the latching member 8 of the latching unit. Furthermore, the second latching projection 88 of the latching unit engages the guide hole 85 in the shorter portion of the right wing 82 of the latching member 8 of the latching unit, and the second latching projection 90 of the latching unit engages the engaging hole 86 in the longer portion of the right wing 82 of the latching member 8 of the latching unit.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A display device, comprising:
  a display having a rear surface; and
  a stand for supporting said display, said stand including
    a bracket mounted on said rear surface of said display, and having a peripheral edge that is formed with a plurality of tabs, and
    a bracket covering including a frame body that frames a portion of said peripheral edge of said bracket and that is formed with a plurality of pockets, each of which receives a respective one of said tabs of said bracket, said frame body including
      a first frame part that is generally U-shaped, that has an outer periphery, and that includes a pair of parallel pliable arms, and an interconnecting arm interconnecting said pliable arms of said first frame part of said frame body of said bracket covering, and a second frame part that is transverse to and that extends from said outer periphery of said first frame part of said frame body of said bracket covering.

2. The display device as claimed in claim 1, wherein said frame body of said bracket covering further includes a plurality of pocket-forming pieces, each of which is provided on said second frame part of said frame body of said bracket covering, each of said pocket-forming pieces and said first and second frame parts cooperating with each other to define a respective one of said pockets.

3. The display device as claimed in claim 1, wherein said stand further includes a latching unit for latching securely and removably said bracket covering to said bracket, said latching unit including a base secured to said bracket, a wing that extends from said base and that is formed with a guide hole and an engaging hole, and a pair of latching projections, each of which is formed on said bracket covering, said latching projections respectively engaging said guide hole and said engaging hole in said wing of said latching unit.

4. The display device as claimed in claim 3, wherein said wing is generally L-shaped, and includes shorter and longer portions, said guide hole being formed in said shorter portion of said wing, said engaging hole being formed in said longer portion of said wing.

5. A display device, comprising:
    a display having a rear surface; and
    a stand for supporting said display, said stand including
        a bracket mounted on said rear surface of said display, and having a peripheral edge that is formed with a plurality of tabs,
        a bracket covering including a frame body that frames a portion of said peripheral edge of said bracket and that is formed with a plurality of pockets, each of which receives a respective one of said tabs of said bracket, and
        a latching unit for latching securely and removably said bracket covering to said bracket, said latching unit including a base secured to said bracket, a wing that extends from said base and that is formed with a guide hole and an engaging hole, and a pair of latching projections, each of which is formed on said bracket covering, said latching projections respectively engaging said guide hole and said engaging hole in said wing of said latching unit.

\* \* \* \* \*